(12) United States Patent
Patel

(10) Patent No.: US 7,828,923 B2
(45) Date of Patent: Nov. 9, 2010

(54) SELF ADHESIVE MATERIAL WITH A WATER SOLUBLE PROTECTIVE LAYER

(75) Inventor: Shilpan Pravinchandra Patel, Mumbai (IN)

(73) Assignee: Arrow Coated Products, Ltd., Mumbai (IN)

( * ) Notice: Subject to any disclaimer, the term of this patent is extended or adjusted under 35 U.S.C. 154(b) by 158 days.

(21) Appl. No.: 11/914,132

(22) PCT Filed: May 11, 2006

(86) PCT No.: PCT/IN2006/000162

§ 371 (c)(1),
(2), (4) Date: Nov. 9, 2007

(87) PCT Pub. No.: WO2007/015264

PCT Pub. Date: Feb. 8, 2007

(65) Prior Publication Data

US 2008/0206461 A1    Aug. 28, 2008

(30) Foreign Application Priority Data

May 11, 2005   (IN) .................. 273/MUM/2005

(51) Int. Cl.
*B32B 37/12* (2006.01)
*B32B 33/00* (2006.01)

(52) U.S. Cl. .................. 156/238; 156/324; 156/246; 428/40.1; 428/40.8

(58) Field of Classification Search .................. 156/155, 156/230, 231, 238, 324, 246; 428/40.1, 41.8, 428/41.7

See application file for complete search history.

(56) References Cited

U.S. PATENT DOCUMENTS

| 2,156,083 | A | * | 4/1939 | Dalton | 442/149 |
| 4,386,183 | A | * | 5/1983 | Wempe | 524/405 |
| 4,699,824 | A | * | 10/1987 | Pufahl | 428/220 |
| 5,316,608 | A | * | 5/1994 | Ocampo et al. | 156/230 |
| 5,655,446 | A | * | 8/1997 | Watanabe | 101/128.21 |
| 5,968,624 | A | * | 10/1999 | Liebe, Jr. | 428/40.1 |
| 6,187,389 | B1 | * | 2/2001 | Overcash et al. | 427/488 |
| 6,193,831 | B1 | * | 2/2001 | Overcash et al. | 156/230 |
| 6,939,588 | B2 | | 9/2005 | Husemann et al. | |

FOREIGN PATENT DOCUMENTS

JP    6322355 A    11/1994

\* cited by examiner

*Primary Examiner*—Kat Wyrozebski
*Assistant Examiner*—Scott W Dodds
(74) *Attorney, Agent, or Firm*—Amin Talati, LLC; Brian M. Wishnow; Janine A. Moderson

(57) ABSTRACT

The invention relates to self adhesive material (SAM) using water soluble film incorporated with surfactants and/or fillers as a protective layer, eliminating the release liner (backing liner). The water soluble film incorporated with surfactants and/or fillers, used as a protective liner, provides easy breakage, faster dissolution as well as easy application to an object. The invention also relates to a process for the preparation of self adhesive material (SAM) without release liner and an apparatus and a method for applying the self adhesive material (SAM) on an object.

6 Claims, 3 Drawing Sheets

Figure 1:
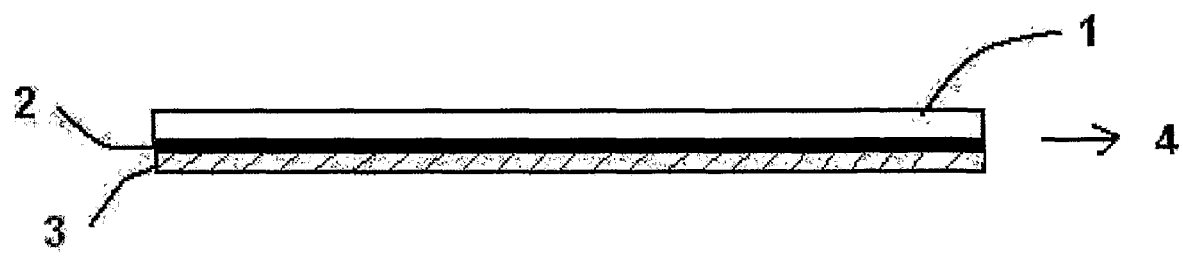

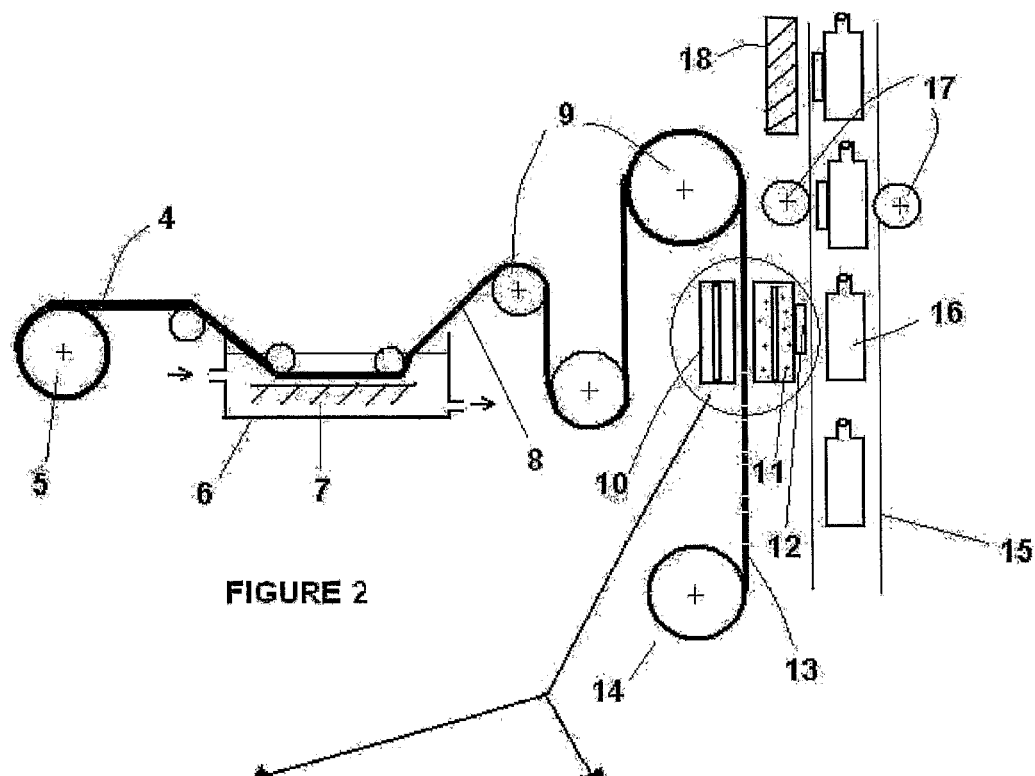
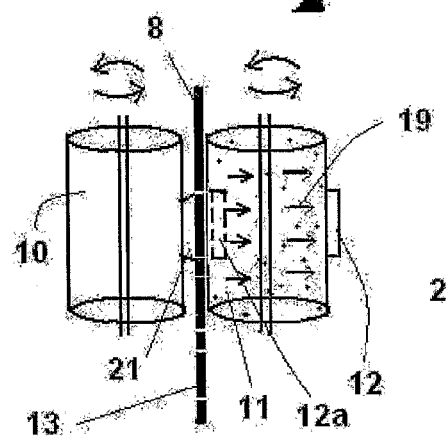
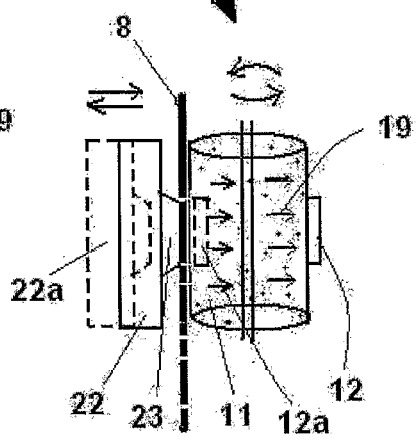
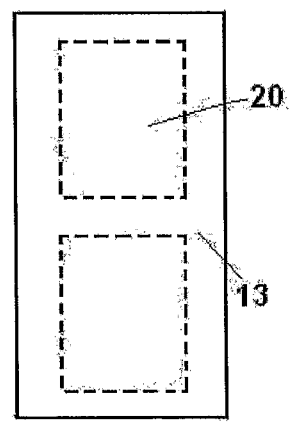
FIGURE 2
FIGURE 2a
FIGURE 2b
FIGURE 2c

SELF ADHESIVE MATERIAL WITH A WATER SOLUBLE PROTECTIVE LAYER

FIELD OF INVENTION

The invention relates to self adhesive material (SAM) using water soluble film incorporated with surfactants and/or fillers as a protective layer, eliminating the release liner (backing liner). The water soluble film incorporated with surfactants and/or fillers, used as a protective liner, provides easy breakage, faster dissolution as well as easy application to an object. The invention also relates to a process for the preparation of self adhesive material (SAM) without release liner and an apparatus and a method for applying the self adhesive material (SAM) on an object.

BACKGROUND OF INVENTION

Traditionally, self adhesive materials consist of a substrate to be printed coated with an adhesive on one side and a release liner on the adhesive side, which is removed while applying the same or a pre-printed, pre cut label on a particular object. Self adhesive material is known as PSA material as the adhesive when exposed to open environment, after removal of the backing liner, shall be applied simply by using specified pressure onto the front of the printed substrate and the object to which it is expected to adhere.

All PSA (pressure sensitive adhesive) coated materials, also known as self adhesive materials must have a release liner or a release coating. Usually it is a type of Silicon coating that assists easy release. Release liners are silicon coated papers, films, foils or fabrics. Silicon coating is done by application of solvent based/water based silicones. These are thermally cured or cured by Electron Beam or by UV radiation. Usually Sulphide pulp/chemically beaten pulp is used for making the paper as this makes the surface coating of silicon more easy due to less penetration. Sometimes primer-coated papers are also used. Similarly films with or without primers, like polyester/polypropylene/PE (polyethylene)/ HDPE (high density polyethylene) etc are also used for silicon coating. Most of these liners are not biodegradable and so are not environmental friendly. Silicones coated with aid of solvents are also adding to pollution.

UV and EB cured silicones gives out high concentration of ozone gas and adds to the pollution levels. Water based silicones are still not very popular due to their non stability. Some of these release liners are not recyclable due to their complex construction, where incineration is the only alternative, thereby creating polluting and toxic gases.

Also, at the time of fixing a self adhesive material on a surface of an object, the release liner is removed and the adhesive layer side of the self adhesive material is pressed on the surface of the object. But due to the nature of the PSA, the problem of crease formation and misalignment, while applying a self adhesive material to a surface is rampant. This ends up in a lot of wastage.

There are self winding tapes (like packaging tapes, BOPP tapes, Cellophane/PVC tapes etc) which don't necessarily use silicon liners or silicon coating on the other side, but these are primer coated on one side and usually use untreated films for aiding its easy release but they do not use a backing liner nor do they use a water soluble film to protect the adhesive or enable it's easy release.

The contemporary methods for producing traditional self adhesive material with release liner have not addressed the need of printers nor have they addressed the environmental concerns, nor have they addressed cost concerns.

Thus, there has been a long felt need by the industry especially involving PSA industry, PSA printers, converters, outdoor signage users, outdoor advertising fraternity and others who require their end products that is capable of being processed by diverse means. None of the methods used earlier or in current practice are capable of making printable PSA materials without using a release liner.

The present invention relates to self adhesive materials, having a protective layer of water soluble film incorporated with surfactants, which will totally eliminate the need for release liners. This will avoid the need of laminating the PSA coated face material with a release liner or to coat the face materials with silicon (like in case of some PSA tapes).

Also there will be no problem of crease formation as the printed face material/label could be adjusted/repositioned properly because of the inbuilt surfactants and fillers and will also help in faster breakage and dissolution of the film.

The environment shall benefit, as the disposal of release liners shall be avoided.

DEFINITIONS PERTAINING TO THE INVENTION

Water Soluble Film (WSF): By definition shall mean Water Soluble film(s) of all types. WSF can be manufactured by process of direct casting on a conveyor, by casting on a detachable liner, by blowing film on extrusion machines, or by extrusion via T-die extrusion. The water soluble protective layer is made of film forming materials selected from polyvinyl alcohol copolymer ionomers, polyvinyl alcohol homopolymer, non-ionomeric poly vinyl alcohol polymer, polymethacrylate, polyvinyl alcohol, polyacrylamide, polymethacrylamide, polyacrylic acid, polymethacrylic acid or polyurethane, polyethyleneglycol, polyvinylpyrrolidone, proteinaceous binders such as gelatin, modified gelatins such as phthaloyl gelatin, polysaccharides such as starch, gum arabic, pullulan or dextrin or water-soluble cellulose derivatives such as methyl cellulose, hydroxylpropyl cellulose, hydroxylpropyl methyl cellulose, hydroxylpropyl ethyl cellulose, hydroxy ethyl cellulose or carboxylmethyl cellulose or combination thereof.

Surfactants selected from anionic based surfactants, cationic based surfactants such as cetyl pyridinium chloride; ampholytic surfactants like dodecyl betaine, dodecyl dimethylamine oxide; nonionic surfactants like alkyl polyethylene oxide, alkyl polyglucosides or a combination thereof and/or fillers selected from calcium carbonate, titanium dioxide, zinc oxide and the like are added into the WSF formulation to provide easy breakage, faster dissolution as well as easy application to an object. The amount of surfactants and/or fillers incorporated into the water soluble protective layer ranges from 0.1% to 30%, preferably from 1% to 20%, more preferably from 2% to 10%.

The WSF can be cold water soluble, warm water soluble or hot water soluble depending upon the end application.

The WSF can be plain, embossed, clear or dyed as per requirement.

The thickness of the water soluble protective layer incorporated with surfactant and/or fillers, ranges from 5 microns to 40 microns, preferably from 10 microns to 30 microns, more preferably from 15 microns to 20 microns.

Face Materials: Face materials in this invention shall mean the substrate on which printing activity is carried out. One side of this material is adhesive coated while the other side will be for printing. This material is selected from paper, film, foil, fabric, ink receptive coated materials or a combination of any of these materials. However, these are by no means limiting. Face materials can be heat sensitive like PVC (poly vinyl chloride), HIPS (High Impact Polystyrene), LLDPE (Linear Low Density Poly Ethylene), Heat shrink Linear Low Density Poly Ethylene but not limited to these. The heat sensitive materials may be used at temperatures ranging from 10° C. to 90° C., preferably from 20° C. to 80° C., more preferably from 25° C. to 60° C. Face materials can be heat resistant like paper, polyester film, kapton film but not limited to these. The heat resistant materials may be used at temperatures ranging from 30° C. to 200° C., preferably from 40° C. to 160° C., more preferably from 50° C. to 150° C. The type of the face material to be used also depends upon the properties of pressure sensitive adhesive being used.

PSA (pressure sensitive adhesive): As the word suggests it is any type of adhesive that shall activate so as to adhere firmly to the desired object on application of any kind of pressure. Pressure can be manual, roller based, pneumatic, hydraulic or any type of mechanical application. It is also clarified that all types of adhesives, including adhesives made from resins or polymers or copolymers of acrylics, rubber, hotmelt, EVA, starch, polyurethane, etc being dissolved in organic/inorganic/hydrocarbon or water based solvents are included in this definition. However, these are by no means limiting. Most of the PSA contain plasticizer, flowing agents, tackifiers and optionally pigments.

Printing and printing method: Printing on the face material is done by any of the known printing methods but not limiting to gravure, flexo, offset, inkjet printing, thermal printing, screen printing, subliminal printing, holographic embossing etc.

SAM: For the purpose of this invention, SAM shall mean self adhesive material with water soluble film incorporated with surfactants and/or fillers as a protective layer.

OBJECTS OF THE INVENTION

An object of the invention is to provide a self adhesive material (SAM), which eliminates the release liner, by providing a protective layer of water soluble film incorporated with surfactants and/or fillers and can be easily applied on the surface of an object.

Another object of the invention is to provide a self adhesive material (SAM), which does not create any liner disposable problem.

Another object of the invention is to provide a process for the preparation of a self adhesive material (SAM)

Yet another object of the invention is to provide an apparatus and a method for applying self adhesive material (SAM) on an object.

Accordingly this invention provides a self adhesive material (SAM) comprising a face material coated/applied with pressure sensitive adhesive (PSA) on its one surface and a protective layer of water soluble film (WSF), incorporated with surfactants and/or fillers, laminated on the adhesive side of the said face material.

The said face material is selected from perforated or non perforated paper, foil, fabric, polymeric materials or a combination thereof. The said face material is heat sensitive made of PVC (poly vinyl chloride), HIPS (High Impact Polystyrene), LLDPE (Linear Low Density Poly Ethylene), Heat shrink LLDPE and the like, or heat resistant such as paper, polyester film or kapton film.

The PSA is selected from any type of adhesive made from resins or polymers or copolymers of acrylics, rubber, hot melt, EVA. starch, polyurethane and the like which are soluble in organic/inorganic/hydrocarbon solvents or water.

The said protective layer formed of WSF is made of film forming materials selected from polyvinyl alcohol copolymer ionomers, polyvinyl alcohol homopolymer, non-ionomeric poly vinyl alcohol polymer, polymethacrylate, polyvinyl alcohol, polyacrylamide, polymethacrylamide, polyacrylic acid, polymethacrylic acid or polyurethane, polyethyleneglycol, polyvinylpyrrolidone, proteinaceous binders such as gelatin, modified gelatins such as phthaloyl gelatin, polysaccharides such as starch, gum arabic, pullulan or dextrin or water-soluble cellulose derivatives such as methyl cellulose, hydroxylpropyl cellulose, hydroxylpropyl methyl cellulose, hydroxylpropyl ethyl cellulose, hydroxy ethyl cellulose or carboxylmethyl cellulose or combination thereof. The said protective layer formed of WSF is incorporated with surfactants selected from anionic based surfactants, cationic based surfactants such as cetyl pyridinium chloride; ampholytic surfactants like dodecyl betaine, dodecyl dimethylamine oxide; nonionic surfactants like alkyl polyethylene oxide, alkyl polyglucosides or a combination thereof. The said protective layer formed of WSF is incorporated with fillers selected from calcium carbonate, titanium dioxide, zinc oxide and the like.

The said surfactants and/or fillers incorporated in WSF ranges from 0.1% to 30%, preferably from 1% to 20%, more preferably from 2% to 10%.

The thickness of the protective layer formed of WSF incorporated with surfactants and/or fillers ranges from 5 microns to 40 microns, preferably from 10 microns to 30 microns, more preferably from 15 microns to 20 microns.

Accordingly this invention provides a self adhesive material (SAM) in which the said face material side of the laminate is printed with desired matter or graphic.

Accordingly this invention provides a self adhesive material (SAM) in which the SAM is provided with a perforating/spaced apart holes/slits along its side edges for guiding the SAM during the application process.

Accordingly this invention provides a process of preparing SAM using WSF incorporated with surfactants and/or fillers as a protective layer, by a direct coating process comprising the following steps:
(i) unwinding a face material from an unwinder of a coating machine,
(ii) applying coating of a PSA on one side of the said face material,
(iii) drying the face material coated with PSA in the dryer section of the coating machine,
(iv) laminating a preformed WSF incorporated with surfactants and/or fillers on the PSA side of the face material and rewinding the SAM laminate on a rewinder.

Accordingly this invention provides a process of preparing SAM using WSF incorporated with surfactants and/or fillers as a protective layer, by a transfer coating process comprising the following steps:
(i) unwinding a release liner from an unwinder of a coating machine,
(ii) applying coating of PSA on the silicone coated side of the said release liner,
(iii) drying the release liner coated with PSA in the dryer section of the coating machine,
(iv) laminating a face material on the PSA coated side of the release liner and rewinding the laminate on a rewinder of the coating machine for transferring the PSA from the said release liner to the said face material,
(v) unwinding the laminate of step (iv), delaminating the release liner, preferably for reuse, and laminating a preformed WSF incorporated with surfactants and/or fillers, on the PSA side of the face material and rewinding the SAM laminate on a rewinder.

Accordingly this invention provides a process for preparing SAM using WSF incorporated with surfactants and/or fillers as a protective layer, comprising the following steps:
(i) unwinding a preformed WSF with liner, incorporated with surfactants and/or fillers, from an unwinder of a coating machine,
(ii) coating/applying PSA on the said WSF surface opposite to the liner,
(iii) drying the WSF coated with PSA in a dryer section of coating machine,
(iv) laminating a face material substrate on the PSA side of the WSF, detaching the liner from WSF and rewinding the SAM laminate Optionally, PSA is applied on the WSF by extruding it through a hot melt extruder and then passing it through the chilling cylinder.

Accordingly this invention provides in which the SAM laminate is printed with a desired matter or graphic on the face material side, by any of the known printing methods such as digital, gravure, flexo, offset, inkjet, thermal screen, subliminal, holographic embossing and the like.

Accordingly this invention provides a process according to claim in which the SAM laminate is provided with guiding holes/spaced apart holes or slits along its edges, by any known method, for guiding the SAM during the application process.

Accordingly this invention provides a process in which the SAM laminate is cut or slitted as per requirement.

Accordingly this invention provides a process, in which drying of the face material or WSF coated with PSA to get the desired adhesive properties is carried out in the dryer section at temperature ranging from 100° C. to 200° C. preferably from 120° C. to 170° C. Accordingly this invention provides process in which the laminate is stored for an ageing period of 1 to 720 hours.

Accordingly this invention provides a label or the like made by cutting or slitting the SAM of this invention, which is preferably having desired printed matter or graphic on the outer surface of the said face material, according to the object such as bottles, boxes, tubes, cartons and the like on which the said label is affixed.

Accordingly this invention provides a method of applying labels made of the SAM of this invention, on an object such as bottles comprising the following steps:
(i) unwinding the SAM laminate/web with protective layer of WSF from an unwinder of a label applying machine/apparatus,
(ii) passing the SAM web through water contained in a trough preferably having scrapping/recycling mechanism for periodically recycling the water in the trough and dissolving the said WSF while passing through the water in the trough to expose PSA side of the web,
(iii) guiding the web with exposed PSA through guide rolls preferably coated with PTFE, in between and rotating punching die cylinder and a two way moving vacuum cylinder with its adhesive side facing the punching die cylinder, for simultaneously cutting and sucking of the printed label, due to negative air pressure in the vacuum cylinder,
(iv) rotating the vacuum cylinder with label to face the adhesive outwards and applying the said label with the aid of the positive air pressure to the object, such as bottle, in front of the cylinder, the said object passing in the vicinity of the vacuum cylinder preferably on a conveyor,
(v) squeezing out the excess water from the label by passing the said object with label applied thereon through the squeeze rolls,
(vi) rewinding the left out part of the web with voids after punching out of the said labels, The water in the trough used for dissolving WSF is at temperature ranging from 5° to 100° C., preferably 10° C. to 95° C. more preferably 30° C. to 90° C.

The said rotating die punching cylinder is replaced by a flat bed punching die.

The said object with label after squeezing the water is dried in a dryer or series of dryers at temperature ranging from 15° C. to 125° C., preferably from 30° C. to 100° C., more preferably from 45° C. to 90° C.

Accordingly this invention provides a method of applying SAM labels on an object in which the printed label is cut out of SAM laminate in desired size and shape, WSF is dissolved in water and the label with exposed PSA is applied to the object with the help of known water based label applicators.

Accordingly this invention provides a method of applying SAM on a desired surface in which SAM is cut in desired size and shape to be used as wide format printed graphic, like bill boards, window graphics, banners, wall graphics, autographics, and the like, passing the said printed graphic through water, dissolving the WSF and exposing the adhesive side of the graphic and applying it on the desired surface by pressure such as manual, air, hydraulic or roller pressure to squeeze out extra water and air voids preferably from the sides or perforates provided on the SAM web, aligning or repositioning the graphics, if required, before finally pressing the label/graphics Accordingly this invention provides a method of applying label/graphics on an object or on any surface substantially as herein described and illustrated in figures of the accompanying drawings.

Accordingly this invention provides a machine/apparatus for applying a label or the like on an object such as bottles or the like comprising an unwinder for unwinding the SAM, a trough with water inlet and outlet for continuous water supply, a scrapping/recycling mechanism provided in the water trough for recycling the water therein periodically, pair of guide rolls preferably coated with PTFE (Polytetra fluoro ethylene) for guiding the SAM web with exposed adhesive after coming out of the water trough, a rotating vacuum cylinder and a rotating die cutting cylinder provided for sucking and punching and applying a label on an object, a rewinder for rewinding the blank of the left-out SAM, a conveyor for moving the object in the vicinity of the rotating vacuum cylinder, a pair of squeeze rolls provided ahead of the rotating vacuum cylinder for squeezing out the excess water and pressing the label on the object Accordingly this invention provides a machine/apparatus in which a flat bed punching die is used in place of a rotating punching die cylinder.

Accordingly this invention provides a machine/apparatus, in which an air dryer or a series of air dryers are provided ahead of the squeezing rolls for drying the label pressed on the object.

Accordingly this invention provides a machine/apparatus, in which sprockets are provided for engaging into the perforations/holes/slits on the side edges of the SAM web for proper movement of the SAM web.

Figure 3:
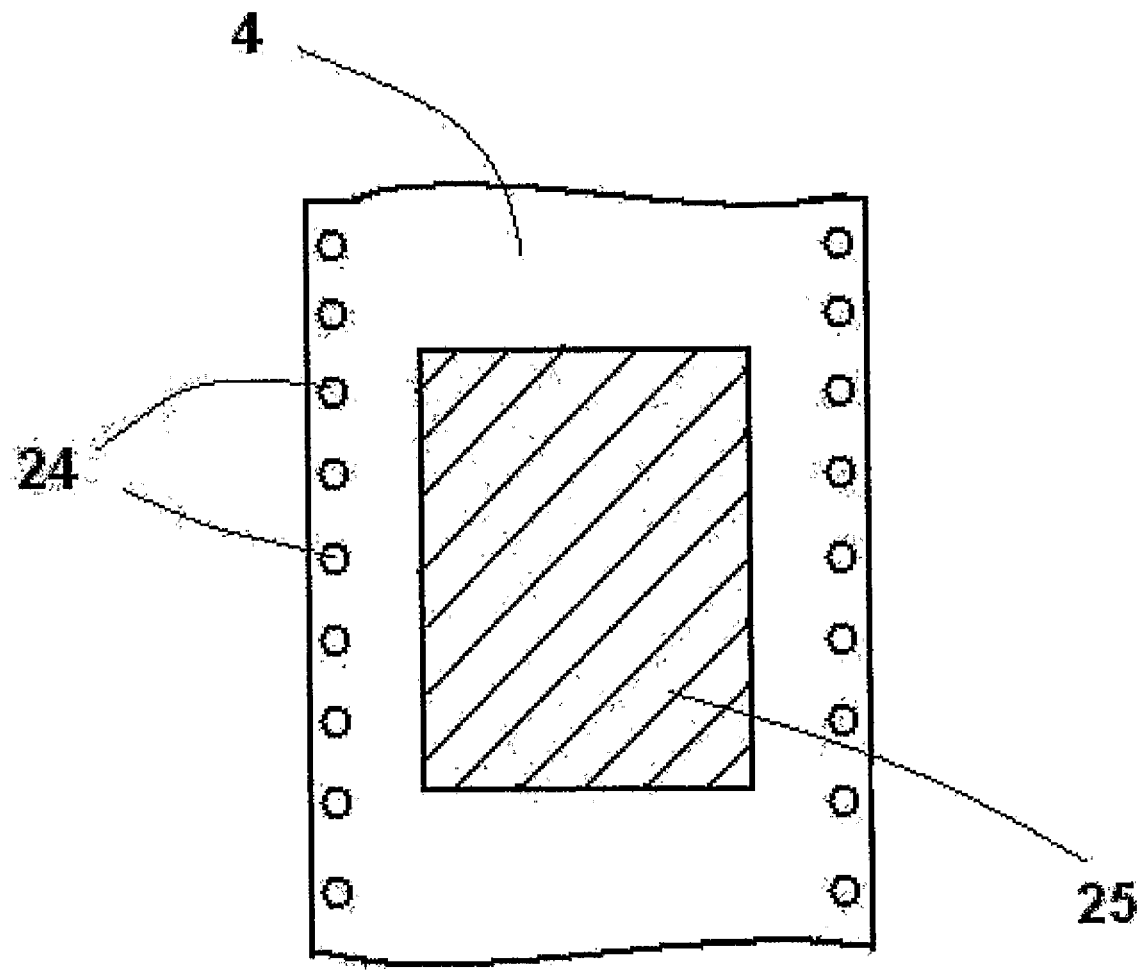

Exemplary Embodiments of the Invention will now be Described with Reference, wherein FIG. 1 shows a cross sectional view of a self adhesive material (SAM) with a protective layer of WSF, FIG. 2 shows an apparatus and method of applying the self adhesive material (SAM), as shown in FIG. 1, on an object, FIG. 2a shows details of a rotating die-cutting cylinder and a rotating vacuum cylinder shown in FIG. 2, FIG. 2b shows details of a flat-bed punching die and a rotating vacuum cylinder according to another embodiment of this invention, FIG. 2c shows the left out web of self adhesive material (SAM) after the label is cut, FIG. 3 shows the self adhesive material (SAM) web provided with guiding holes on both sides of the web.

Referring to FIG. 1, the SAM with a protective layer of WSF comprises a face material (1) provide with a pressure sensitive adhesive (2) on one side, a protective layer (3) made of WSF incorporated with surfactants provided on the adhesive layer (2), forming a self adhesive material (4).

In one of the embodiment of the invention, the self adhesive material (SAM) is manufactured by direct coating process, wherein the adhesive is directly coated on the face material and then laminated with a preformed WSF, incorporated with surfactants and/or fillers on the adhesive side of face material.

In a further embodiment of the invention, the self adhesive material (SAM) is manufactured by a transfer coating process, wherein a face material is laminated to a release liner coated with the adhesive so that the adhesive will get transferred on the face material and then after removal of release liner, the adhesive side of the face material is laminated to a preformed WSF, incorporated with surfactants and/or fillers.

In yet another embodiment of the invention, the self adhesive material (SAM) is manufactured by coating of PSA or extruding of PSA on a preformed WSF, incorporated with surfactants and/or fillers and then laminating a face material on the adhesive side of WSF.

The process for preparing a self adhesive material (SAM) by a direct coating process, according to one of the embodiment, comprises the following steps:

a. Unwinding a face material from an unwinder of a coating machine and applying PSA on the face material. The face material can be perforated or non perforated and is selected from but not limited to paper, polymeric materials, foil, fabric or a combination of any of these. The substrate can be heat sensitive substrate made of poly vinyl chloride (PVC), High Impact Polystyrene (HIPS), Linear Low Density Poly Ethylene (LLDPE) or Heat shrink Linear Low Density Poly Ethylene. The substrate can be also heat resistant such as paper, polyester film or kapton film. Pressure sensitive adhesive (PSA) is selected from any type of adhesive, which can adhere firmly the wide format printed graphic to the desired surface on application of any kind of pressure. Pressure can be manual, roller based, pneumatic, hydraulic or mechanical. Pressure sensitive adhesive includes adhesives made from resins or polymers or copolymers of acrylics, rubber, hotmelt, EVA, starch, polyurethane, etc which are soluble in organic/inorganic/hydrocarbon or water based solvents.

b. Drying the face material coated with PSA in the dryer section so as to get the desired adhesive properties. The temperature in the dryer section ranging from 100° C. to 200° C., preferably from 120° C. to 170° C.

c. Laminating a preformed water soluble protective layer incorporated with surfactants and/or fillers on the adhesive side of the face material to form a self adhesive material (4).

The water soluble protective layer is made of film forming materials selected from polyvinyl alcohol copolymer ionomers, polyvinyl alcohol homopolymer, non-ionomeric poly vinyl alcohol polymer, polymethacrylate, polyvinyl alcohol, polyacrylamide, polymethacrylamide, polyacrylic acid, polymethacrylic acid or polyurethane, polyethyleneglycol, polyvinylpyrrolidone, proteinaceous binders such as gelatin, modified gelatins such as phthaloyl gelatin, polysaccharides such as starch, gum arabic, pullulan or dextrin or water-soluble cellulose derivatives such as methyl cellulose, hydroxylpropyl cellulose, hydroxylpropyl methyl cellulose, hydroxyl propyl ethyl cellulose, hydroxy ethyl cellulose or carboxylmethyl cellulose or combination thereof.

Surfactants selected from anionic based surfactants, cationic based surfactants such as cetyl pyridinium chloride; ampholytic surfactants like dodecyl betaine, dodecyl dimethylamine oxide; nonionic surfactants like alkyl polyethylene oxide, alkyl polyglucosides or a combination thereof and/or frillers selected from calcium carbonate, titanium dioxide, zinc oxide and the like are added into the WSF formulation to provide easy breakage, faster dissolution as well as easy application to an object. The amount of surfactants and/or fillers incorporated into the water soluble protective layer ranges from 0.1% to 30%, preferably from 1% to 20%, more preferably from 2% to 10%.

The protective layer formed of WSF incorporated with surfactants and/or fillers is preformed in a known manner wherein the surfactant(s) is/are mixed along with the raw materials of WSF.

The thickness of the water soluble protective layer incorporated with surfactants and/or fillers; ranges from 5 microns to 40 microns, preferably from 10 microns to 30 microns, more preferably from 15 microns to 20 microns.

d. Rewinding the laminate and optionally storing the laminate an ageing period of 1 to 720 hours.

e. Optionally printing on the face material side of the laminate. Printing on the face material is done by any of the known printing methods but not limiting to digital, gravure, flexo, offset, inkjet printing, thermal printing, screen printing, subliminal printing, holographic embossing etc.

f. Slitting and cutting the printed laminate as per requirement.

The process for preparing a self adhesive material (SAM) by a transfer coating process, according to one of the embodiment, comprises the following steps:

a. Unwinding a release liner from the unwinder of a coating machine and coating of PSA on the silicone coated side of the release liner.

b. Drying the release liner coated with PSA in the dryer section so as to get the desired adhesive properties. The temperature in the dryer section ranging from 100° C. to 200° C., preferably from 120° C. to 170° C.

c. Laminating a face material on the adhesive side of the release liner and rewinding the laminate on a rewinder of a coating machine. Optionally, the laminate can be stored for an ageing period of 1 to 720 hours.

d. Unwinding the laminate of step c, delaminating the release liner and laminating a preformed WSF incorporated with surfactants and/or fillers, on the adhesive side of the face material to form a self adhesive material (4). The delaminated release liner can be reused.

e. Rewinding the laminate and optionally printing on the face material side of the laminate. Printing on the face material is done by any of the known printing methods but not limiting to digital, gravure, flexo, offset, inkjet printing, thermal printing, screen printing, subliminal printing, holographic embossing etc.

f. Slitting and cutting the printed laminate as per requirement.

The process for preparing a self adhesive material (SAM), according to one of the embodiment, comprises the following steps:

a. Unwinding a preformed WSF along with a liner at the unwinder of a coating machine. The said preformed WSF is incorporated surfactants and/or fillers.
b. Coating of a pressure sensitive adhesive on the WSF side by known methods of coating and drying the adhesive to get the desired adhesive properties. The temperature in the dryer section ranging from 100° C. to 200° C., preferably from 120° C. to 170° C.

Optionally, pressure sensitive adhesive (PSA), can also be applied by extruding it through a hot melt extruder on to the preformed WSF along with liner and then passing it through the chilling cylinder.

c. Laminating a face material on the adhesive side of the WSF and detaching the liner.
d. Rewinding the laminate and optionally storing the laminate an ageing period of 1 to 720 hours.
e. Optionally printing on the face material side of the laminate. Printing on the face material is done by any of the known printing methods but not limiting to digital, gravure, flexo, offset, inkjet printing, thermal printing, screen printing, subliminal printing, holographic embossing etc.
f. Slitting and cutting the printed laminate as per requirement.

The self adhesive materials (SAM) of the invention, eliminates the release liner and the necessity of removing it at the time of fixing it on a surface. Resultant liner disposal and environmental problems have also been eliminated. In order to fix the self adhesive material (SAM) of the invention on a surface, water is sprayed or applied on the water soluble protective layer or alternatively the self adhesive material (SAM) is dipped in water so as to dissolve the water soluble protective layer. The self adhesive material (SAM) is straightway fixed on the surface against the adhesive layer and excess water is pressed down. The surfactant provides sliminess to the self adhesive material and aids to reposition the self adhesive material on the surface, while the filler will help in easy breakage of the WSF and will make the film opaque. As the protective layer is water soluble and biodegradable it does not create any disposal and environmental problems. The cost of the final product is also reduced as the release liner, which constitutes about 20 to 30% of the whole construction is eliminated and the water soluble protective layer used is very thin and will not add much to the cost of the final product.

The self adhesive materials (SAM) enables the present label users to apply labels to the final object like bottles, cartons, etc, by passing the label or a web of self adhesive material into water so that the WSF will start dissolving and subsequently using a die online to cut and apply the label to the object using air pressure, hydraulic pressure, roller pressure, etc, till the final label is pressed securely to the desired object.

This will help easing the process of application of self adhesive printed materials by eliminating the step of removal and disposal of release liner, thereby getting higher speeds which were hitherto limited by the slow speed of releasing the liner and in some cases by the slow speed of automatic winders on which this waste backing liners were being rewound for eventual disposal.

The invention shall also avoid an additional process of pre cut label punching which is usually done offline. The invention describes a unique process of using a printed web, water trough and die punching during the process of label application.

The apparatus for applying the SAM on an object mainly comprises an unwinder (5) for unwinding the SAM (4), a water trough (6) with inlet and outlet for continuous water supply, a scrapper (7) provided in the water trough (6), pair of guide rolls (9) coated with PTFE (Polytetra fluoro ethylene) for guiding the SAM after the WSF is dissolved in water and passing it in between a rotating vacuum cylinder (11) and a rotating die cutting cylinder (10) provided for sucking and punching a label of SAM, a rewinder (14) for rewinding the blank (13) of the left-out SAM. A conveyor (15) for moving the object (16), such as a bottle, in the vicinity of the rotating vacuum cylinder (11) so that the label (12) cut by the rotating die-cutting cylinder (10) and sucked by the rotating vacuum cylinder (11) is applied to the object (16), a pair of squeeze rolls (17) provided ahead of the rotating vacuum cylinder (11), for squeezing out the excess water and pressing the label (12) on the object (16) and optionally a dryer (18) provided ahead of the squeeze rolls (17), for drying the label (12) pressed on the object (16).

Alternatively, instead of a rotating die cutting cylinder (10), a flat-bed die punch (22a) can be used.

The method of applying self adhesive labels to an object such as a bottle is as described below as shown in FIG. 2:

(i) Unwinding a printed self adhesive material (SAM) web (4), as shown in FIG. 1, at unwinder (5), such that the WSF will be on inner side while unwinding.
(ii) Passing the printed self adhesive web (4) through a trough (6) containing water with a scrapping/recycling mechanism (7) so that the water can be recycled periodically. The temperature of the water ranging from 5° C. to 100° C., preferably 10° C. to 95° C. or preferably 30° C. to 90° C.

As the printed web passes through the trough, the WSF will start dissolving and will expose the adhesive side of the web.

Optionally, the WSF of the SAM (4) can be on the outer side while rewinding and the scrapper (7) can be placed above the web (4) when it passes through the water trough (6) and simultaneously the positions of the guide rolls (9) coated with PTFE (poly tetra fluoro ethylene) and the conveyor (15) carrying objects (16) to be labeled will also change accordingly.

(iii) The printed web (8) with exposed adhesive is then passed through a series of guide rolls (9) preferably coated with PTFE (Poly tetra fluoro ethylene) and then is passed in between a rotating die punching cylinder (10) and a two-way moving vacuum cylinder (11). Optionally, a flat-bed punching die (22a) can be used in place of a rotating die and an air/vacuum based female die can be used in place of vacuum cylinder.
(iv) As elaborated in FIG. 2a, when the printed web (8) reaches in between the rotating die-punching cylinder (10) and the two-way moving vacuum cylinder (11) (adhesive side of the tape facing the die punching cylinder), the vacuum cylinder (11) will suck the web (8), due to the negative air pressure in the vacuum cylinder, and at the same time, the die-punching cylinder will cut a label (12a) out of the web. The vacuum cylinder (11) having the cut label (12a), will then rotate so that it faces the conveyor carrying bottles and the label will then be applied to a bottle in front of the vacuum cylinder with the aid of positive (as shown by the direction 19) pressure (as shown by the air direction 19) of the vacuum cylinder.

Before vacuum cylinder (11) rotates to become a positive air pressure cylinder to act as an applicator of the label to the bottle, the die punch goes back to its original position and the web gets sucked by the cylinder (11).

The process of application of the label (12) to the bottle with the help of positive air pressure and the sucking of the web (8) due to the negative pressure of air (vacuum) is simultaneous and a continuous process.

A flat bed die (22) having a die punch (23) as shown in FIG. 2b can also be used in place of a rotating die. The flat bed die will move back and forth as shown in the FIG. 2b, wherein the displacement of the die from its normal position (22a) to the position when it cuts the label out of the web is shown.

(v) The bottle with the printed label is then passed through squeeze rolls (17) to remove excess water. Optionally, the bottle can be passed through a series of air dryers (18) to dry the label pressed on the bottle. The temperature in the air dryer ranges from 15° C. to 125° C., preferably from 30° C. to 100° C., more preferably from 45° C. to 90° C.

(vi) Rewinding of waste matrix (13) at the rewinder (14). The waste matrix (13), as shown in FIG. 2c, consists of die punched voids (20) and the outside are consisting of face material and adhesive.

The self adhesive material (SAM) web (4), optionally with a printed graphic (25), may also be provided with guide holes (24) used to guide the same through the process of label application.

The printed self adhesive materials (SAM) as per the invention can also be used as sheet cut labels by present label applicators, using traditional water based label applicators, like pharma labels or beer/wine bottle labels. The stack of printed sheets made from printed self adhesive materials (SAM) can be cut into desired size and shape and the present label applicators once modified to dissolve the WSF and expose PSA, can be used to apply labels to specific objects.

The printed self adhesive materials (SAM) as per the invention can also be used by the present label applicators as wide format printed graphics like, but not limited to billboards, window graphics, banners, wall graphics, autographics, etc to apply on the desired surface, by passing the printed graphics or a web of printed materials through water, thus dissolving the WSF and exposing the adhesive side of the graphic and then applying on the desired surface by either manual pressure, air pressure, hydraulic pressure, roller pressure etc. The extra water and air voids can be squeezed out from the sides or perforates till the final label is pressed securely to the surface and yet allow the printed graphics to reposition the same, during a specified time limit, which will depend upon the ambient temperatures and PSA formulations.

I claim:

1. A process for producing a self adhesive material (SAM), comprising:
    (aa) unwinding a preformed WSF from an unwinder of a coating machine, said preformed WSF having a liner on one surface;
    (bb) coating the PSA on a surface of the said WSF opposite the liner;
    (cc) drying the WSF coated with PSA in a dryer;
    (dd) laminating a face material/substrate on a surface of the PSA opposite the WSF, the face material/substrate selected from a paper, a foil, a polymeric material selected from the group consisting of PVC (poly vinyl chloride), HIPS (High Impact Polystyrene), LLDPE (Linear Low Density Poly Ethylene), heat shrink LLDPE, polyester film, kapton film and combinations thereof, a fabric and combinations thereof, and wherein the face material/substrate includes a material on which graphic or indicia can be printed/written;
    (ee) detaching the liner from the WSF to form the SAM; and
    (ff) rewinding the SAM on a rewinder.

2. The process of claim 1, wherein the said drying is carried out in the dryer section at a temperature ranging from 100° C. to 200° C.

3. The process of claim 1, further comprising storing the SAM for an aging period of 1 to 720 hours.

4. The process of claim 1, wherein said drying is carried out in a dryer at temperature ranging from 120° C. to 170° C.

5. The process of claim 1, wherein the laminate is stored for an aging period of of 12 to 360 hours.

6. The process of claim 1, wherein the laminate is stored for an aging period of 24 to 180 hours.

* * * * *